United States Patent [19]

Lesieur

[11] 4,383,281

[45] May 10, 1983

[54] METHOD AND ARRANGEMENT FOR MAGNETIC DIGITAL RECORDING WITH HIGH FREQUENCY BIASING WITH SUPPRESSION OF DC COMPONENTS IN THE RECORDING SIGNALS

[75] Inventor: Jean-Paul Lesieur, Massy, France

[73] Assignee: Compagnie Internationale pour l'Informatique CII-Honeywell Bull (Societe Anonyme), Paris, France

[21] Appl. No.: 162,421

[22] Filed: Jun. 24, 1980

[30] Foreign Application Priority Data

Jul. 2, 1979 [FR] France ................................ 79 17172

[51] Int. Cl.³ ............................................ G11B 5/09
[52] U.S. Cl. ...................................... 360/45; 360/40; 360/42; 360/43
[58] Field of Search ....................... 360/40, 42, 43, 45; 375/56

[56] References Cited

U.S. PATENT DOCUMENTS

| | | | |
|---|---|---|---|
| 3,215,779 | 11/1965 | Halm et al. .............................. | 375/56 |
| 3,551,816 | 12/1970 | Paine ...................................... | 375/56 |
| 3,641,524 | 2/1972 | Norris .................................... | 360/40 |
| 3,952,329 | 4/1976 | Dent et al. .............................. | 360/40 |
| 3,980,824 | 9/1976 | Lamb et al. ............................ | 325/30 |
| 4,017,903 | 4/1977 | Chu ........................................ | 360/40 |
| 4,202,017 | 5/1980 | Getton et al. .......................... | 360/45 |
| 4,234,897 | 11/1980 | Miller .................................... | 360/45 |

FOREIGN PATENT DOCUMENTS 1333951 10/1973 United Kingdom .

OTHER PUBLICATIONS

"DC-Balancing Resynchronization Symbols"-IBM T.D.B., vol. 18, #6, Nov. 1975.
"High Density Recording with Write Current Shaping"-Jacoby, G., IEEE Transactions on Magnetics, vol. 15, #3, Jul. 1979.

Primary Examiner—Vincent P. Canney
Attorney, Agent, or Firm—Kerkam, Stowell, Kondracki & Clarke

[57] ABSTRACT

The invention relates to the generation of a digital magnetic recording signal modulated in phase in correspondence with the transitions of the corresponding data signal. According to the invention, the D.C. component of the recording signal is suppressed so that the recording winding can be excited by this signal by means of a transformer. The recording head can include only a single turn.

8 Claims, 21 Drawing Figures

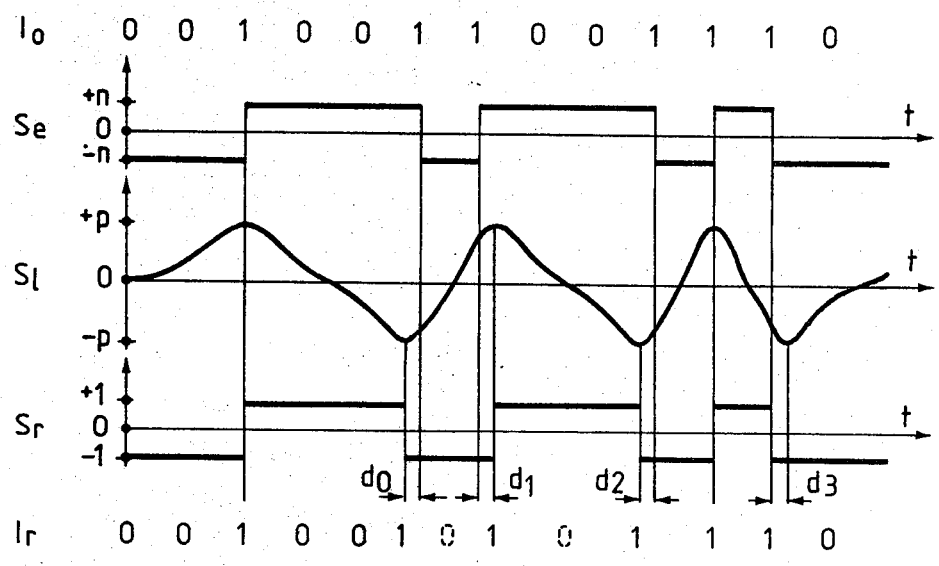
FIG. 1 (PRIOR ART)
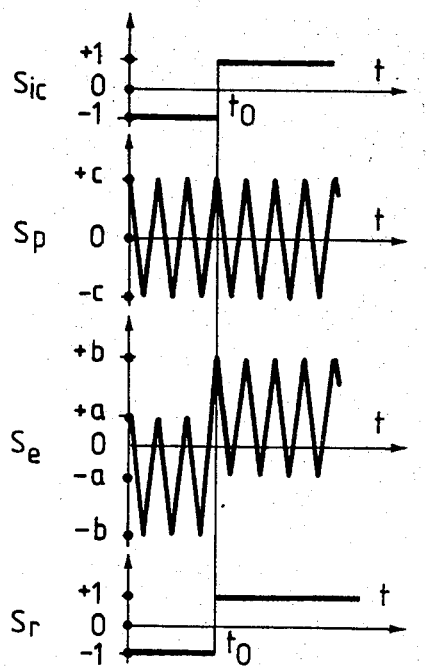
FIG. 2A
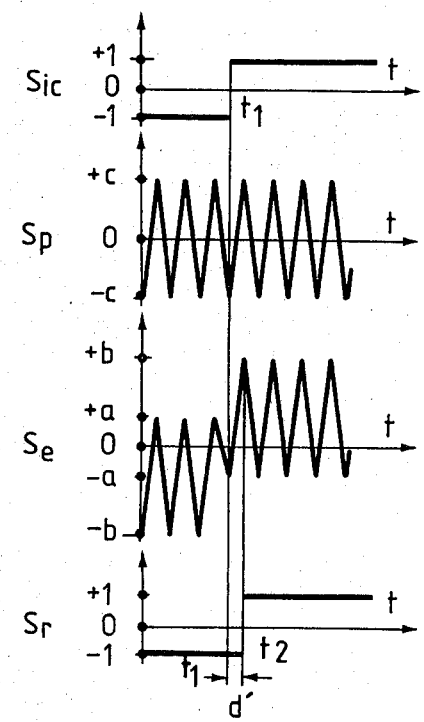
FIG. 2B
FIG. 2 (PRIOR ART)

METHOD AND ARRANGEMENT FOR MAGNETIC DIGITAL RECORDING WITH HIGH FREQUENCY BIASING WITH SUPPRESSION OF DC COMPONENTS IN THE RECORDING SIGNALS

BACKGROUND OF THE INVENTION

1. Field of the Invention

The invention relates to a method and an arrangement for magnetic digital recording with high frequency biasing.

2. Description of the Prior Art

The magnetic recording of a data signal consists basically in creating a write current in a magnetic head which produces on one face of a magnetic support such as a tape, disc or drum a residual magnetization representative of the initial data.

In the case of an electric analog data signal, for example, a signal whose amplitude is representative of sound from an acoustic transducer, it is evident that the residual magnetization created by the write current should faithfully reproduce, in time, the amplitude of the data signal. This is universally obtained by superimposing on the data signal a high frequency, constant amplitude, alternating current signal which constitutes a magnetic biasing. Put briefly, the curve of first magnetization of the magnetic material of the recording carrier starts with a quadratically curving part, extends in a linear part and ends in a part which curves in to end in saturation. Without the magnetic biasing current, the recording of the data signal would correspond to making a more or less large excursion in the curve of the first magnetization from its origin and at each point of the recording carrier according to the level of amplitude of the write signal. The quadratic part of the curve would always be involved so that the recorded signal would present a high rate of distortion. The superposition on the data signal of a high frequency, constant amplitude, alternating current signal constitutes a magnetic biasing in this sense that the excursions can then be made in the linear part of the curve of first magnetization. Furthermore, the high frequency magnetic biasing leaves the recording carrier non-magnetized in the absence of the data signal, the more so since the corresponding wavelength of the biasing current is inferior to the power of resolution of the read head, which power is essentially dependent on the value of the read air gap. On the other hand, although a direct current magnetic biasing is also possible, it would place the recorded carrier, in the absence of the data signal, in a permanently magnetized state which would be reflected in the read signal by a great background noise.

A binary coded digital data signal indicates successively, at a given recurrence frequency, the value 0 or 1 of a data bit. This signal comprises, therefore, two correlative components—a repeated series of instants and a series of corresponding binary values—which the residual magnetization should normally translate faithfully. To do this, it is attempted to represent at least one of the two binary values by a magnetic flux transmission determined as a function of a selected code, occurring at a precise corresponding instant.

In current practice, magnetic transitions are advantageously inversions of biasing of the residual field, designed to make this field change between two predetermined positive and negative biasing levels of the magnetic material of the recording carrier. The result of this is to create in this carrier a set of magnets placed end-to-end, with adjacent poles of the same kind, and of length corresponding to the time interval separating two transitions confirming to the type of coding chosen. By convention, a reversal of the residual field form a negative level to a positive level of biasing will be called a positive transition, the reversal in the opposite direction being therefore a negative transition.

Among the types of coding most used is that called NRZ1 (Non Return to Zero for bits of value "1"). In the NRZ1 code only the 1 values are represented by magnetic transitions, independently of the direction of these transitions. In another popular code called "coded phase", the two binary values correspond respectively to the positive and negative transitions. As will be seen later, the invention is unaffected by the method of coding chosen.

Various problems arise relative to the fidelity of recording and reading of the other component of the digital data signal relative to the instants at which the transitions should have taken place.

It has been noted previously that the binary data is translated on the recording carrier as a series of magnets placed end-to-end, of which the adjacent poles are of the same name and translate the existence of a transition. The read current produced by the read head during passage of two adjacent semi-magnets is, therefore, in the form of a clock or a bell-shaped curve, of which the peak corresponds to the transition, since the variation of magnetic flux in the read winding is greatest during passage of the two neighboring poles of the two magnets before the air gap of the read head. However, when two transitions are very close together (which is the case with high recording densitities), the successive curves run into each other or combine so that the current peaks are offset from the actual transitions. This phenomenon, more generally known as peak shift, increases with the frequency of transitions so that, for high recording densitities, the peaks can be shifted by up to about one third of the smallest space which can separate two transitions. The decoding circuits must therefore be very active, the more so since to this shifting variations in the speed of travel of the recording carrier are added. Various attempts have therefore been made with a view to reducing the size of the peak shift.

Results have been obtained in this direction by using a digital recording signal similar to an analogue recording signal. Experience has in fact shown a reduction in peak shift for high write densities, about around 200 inversions of flux per millimeter, with a composite recording signal formed by the superposition of a high frequency, constant amplitude, magnetic biasing alternating signal on the digital coded data signal.

In this composite recording signal, each transition is represented by a difference in peak amplitudes of the same sign as two neighboring half-waves of the biasing signal which are present respectively before and after the instant of transition corresponding to the data signal. Thus, the high frequency biasing is of interest from the moment when these two alternations are separated by a fixed time interval, theoretically corresponding to the period of the biasing signal and resulting in a suppression of the peak shift. However, in alternating biasing, digital recording devices of the prior art, this time interval can deviate unequally and erratically from the value of this period and can cause uncertainties and errors in decoding the signal registered by these devices. These deviations result from the random distribution of transitions in the coded digital data signal, the latter being therefore able to arise at any instant in a period of the magnetic biasing signal and act so that the superposition of the two signals is more or less favorable. The more favorable situation (zero deviation) occurs when there is a coincidence between a transition of a given sign and the peak amplitude of the same sign of the biasing signal. On the other hand, the deviation is maximum when the transition of a given sign occurs at the moment when the biasing signal reaches a peak amplitude of the opposite sign, in which case the following peak amplitude is delayed by about a half-wavelength of the biasing signal.

It follows that the size of the peak shift depends on the phase of the biasing signal with respect to the coded signal and that, if the shift is on average effectively reduced by the biasing, relatively high values can be obtained for certain transitions and very active circuits will be needed for the reading and decoding of signals recorded in this manner.

To avoid this peak shift, it would appear of interest to render the biasing signal synchronous, as regards frequency, with the clock for controlling the coded digital signal to be recorded. However, because the positive and negative transitions in the coded signal are distributed in a random manner, the phase that exists between each transition and the magnetic biasing signal remains uncertain, so that more or less favorable cases will still occur, as in the preceding case.

The increase in the frequency of the biasing signal with respect to the higher recurrence frequency of transitions diminishes the peak shift effect, but it is limited by the fact that it raises the electromagnetic losses in the materials forming the recording heads. Furthermore, the peak shift can be reduced by a judicious relationship between the frequency of the magnetic biasing signal and the clock frequency according to the rhythm at which the coding is effected. Nevertheless, an improved decoding device is necessary.

One solution to avoid the appearance of any unfavorable case during elaboration of a digital recording signal with alternating biasing is described in my co-pending application Ser. No. 156,368, corresponding to French application No. 79.15884. This solution consists in phase modulating relative to the transitions of the coded data signal, a standard, high frequency, original biasing signal, consisting of a sinusoidial signal or, more usually, a rectangular or square wave signal. In this connection, it is pointed out that a square wave signal is a pulse signal of which the cyclic relationship between the pulse duration and its period of recurrence is 0.5. A pulse signal with a cyclic ratio different from 0.5 is called a rectangular signal. More precisely this phase modulation is translated by a successive shift by 180° of the original biasing signal from each appearance of the transitions of the coded data signal. Each transition thus reflects back, in the modulated biasing signal, by a doubling of the pulse or the correponding alternation of the original biasing signal, so that the superposition of the modulated biasing signal to the data signal is always produced in favorable conditions, i.e. not raising any problem for combination of signals bordering on variable and random delays in appearance of the recording signal transitions with respect to the transitions of the data signal.

The present invention profits from this method of recording to simplify the manufacture of read heads called "integrated" read heads, i.e. miniature heads obtained by depositing thin layers on common or individual substrates.

Magnetic writing of digital data on a recording carrier requires passage in a write coil of recording currents of sufficiently high intensities to advantageously produce fields of saturation of the magnetic material of the recording carrier capable of thus optimizing the residual fields on the recording carrier and facilitating reading of data as a result. Further, with the codes usually used for formation of the coded data signal, the random distribution of transitions means that the average value of the recording current is itself occasionally nil, which separates use of a current transformer downstream of the writing winding with a view to increasing the recording field with a winding which has a reduced number of turns (preferably one turn). The result was that the previous recording devices with conventional codes had to include recording heads with a winding composed of a relatively high number of turns (ordinarily of the order of $2 \times 10$ turns). The manufacture of a winding with several superposed turns in an integrated head presents many difficulties, which have given rise to numerous inventions, among which will be noted those described in French Pat. Nos. 2063693 and 2063694. A one turn winding is therefore desirable.

In this way, one solution requires a specific code enabling to obtain on average a nil value of the recording current. However, this method necessitates a reduction in the amount of useful data with respect to the amount of original data and further prohibits recording of normalized codes.

SUMMARY OF THE INVENTION

The present invention remedies this inconvenience by implementing a method for magnetic recording of a digital data signal composed of a set of transitions of the type consisting in forming a recording signal by superposing on the said data signal a high frequency constant amplitude, magnetic bias signal whose phase is modulated relative to the said data signal transitions and is characterized in that it consists in giving to the recording signal a substantially zero D.C. component.

In the recording signal with a phase-modulated biasing signal to which the invention is applied, only the strong and weak current amplitudes are taken into account on reading and restoration of data since they determine the working zone on the magnetization curve of the magnetic material of the recording carrier independently of the switching times between strong and weak currents. This enables, therefore, the recording signal to present a practically zero D.C. component whatever the frequency and waveform of the biasing signal and the code used, acting so that, during each period of the biasing signal, the amount of strong current is equal to the amount of weak current. With a pulsed biasing signal, it will suffice simply to adjust the cyclic relationship as a result.

It follows that a device according to the invention for magnetic recording of a digital data signal composed of a series of transitions is of the type comprising magnetic biasing means for delivering a high frequency, constant amplitude, biasing signal of which the phase is modulated in correspondence with the transtions of the said data signal, means for combining the data signal with the phase modulated biasing signal to furnish a recording signal and a recording head including a winding excited by the said recording signal and characterized in that it comprises means for suppression of the D.C. component of the recording signal.

In the case of a pulse biasing signal, the readjustment of the cyclic relationship of this signal suffices to cancel the D.C. component of the recording signal and thus permits the use of a transformer for excitation of the recording head winding. Thus, the winding can be reduced to a single turn, which greatly simplifies manufacture of the integrated recording heads while offering the possiblity of increasing their degree of integration for otherwise equal recording conditions.

BRIEF DESCRIPTION OF THE DRAWINGS

The characteristics and advantages of the invention will be seen more clearly from the text which follows with reference to the accompanying drawings, in which:

FIG. 1 illustrates an example of digital magnetic recording in NZR1 of the prior art technique, not using alternating magnetic biasing;

FIG. 2 comprising parts 2A and 2B illustrate, respectively, the most favorable and least favorable cases of digital recording with alternating biasing of the prior art;

DESCRIPTION OF THE PREFERRED EMBODIMENTS

Figure 3:
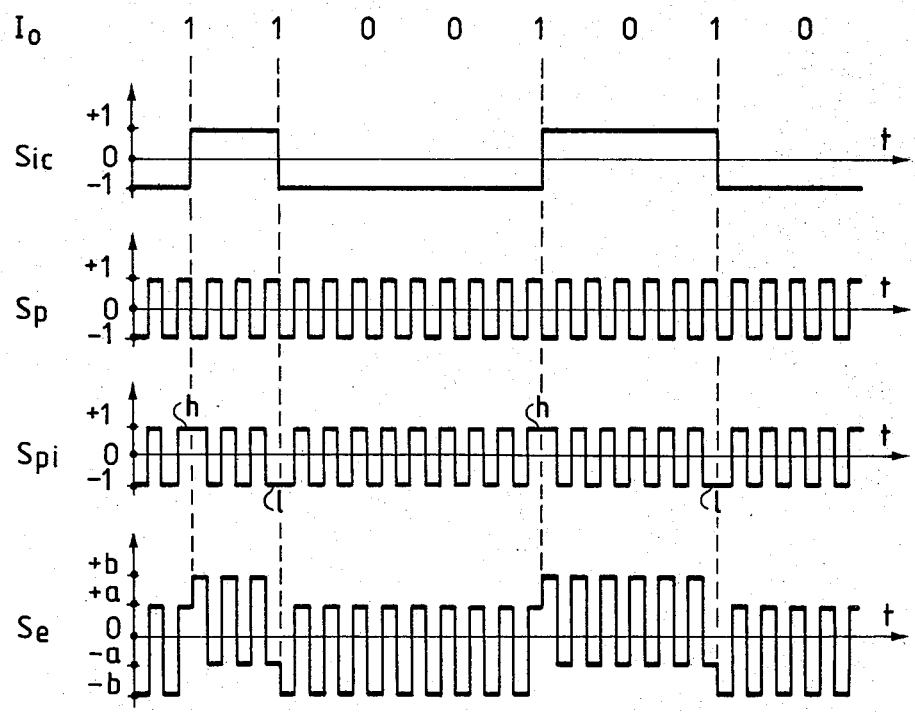
FIG. 3 illustrates an example of digital magnetic recording in NRZ1 with a phase modulated biasing signal to which the present invention can be applied.

The invention will be better brought out followng a short description of the results obtained by previous digital magnetic recording devices, with references to FIGS. 1, 2A and 2B.

FIG. 1 relates to a digital magnetic recording of the NRZ1 type with no biasing. In this FIG. $1_o$ designates the original binary data to be recorded, formed by a recurrent set of bits such as are indicated by way of example. $S_e$ designates the recording signal, also called the write signal, resulting from the coding of the original data $I_o$ in NRZ1. $S_l$ designates the corresponding read signal obtained across the terminals of the winding of the read head on passage of the data carrier carrying the recording of the write signal $S_e$. $S_r$ designates the signal reproduced from the read signal $S_l$ with a view to obtaining a representation of the digital signal read in the NRZ1 code, and $I_r$ designates the information reproduced after decoding signal $S_r$.

Thus, the recording signal $S_e$ is an alternating signal of which the transitions correspond to the bits of value 1 and of which the positive amplitude +n and the negative amplitude −n ordinarily correspond to the positive and negative saturation levels of the magnetic recording material. A read signal, obtained from the terminals of the winding of a read head, has the shape of a positive or negative humped curve according to whether the transition itself is positive or negative and the summit (or peak) of which represents the moment of transition. The occurrence of the peak should correspond to the recording of a transition which is present and isolated on a data carrier. However, because of the variable proximity of the transitions on the one hand and of the high density of recording sought for on the other hand, the hump-shaped characteristics produced at each transition combine together more or less according to their proximity and, as a result, have peaks +p and −p more or less offset from the representative instants of the transitions. Various peak shift values d0, d1, d2 and d3 are indicated by way of example of FIG. 1. Given that the peaks determine the instants of appearance of the transitions and that they are variably offset from these transitions, the signal $S_r$ reproduced from the peaks of the read signal $S_l$ is different from the recording signal $S_e$ although, ideally, the signals $S_e$ and $S_r$ should be identical. Because of the peak shifts d0 to d3, the decoding of the reproduced signal $S_r$ results in an unfaithful reproduction which can produce an item of data $I_r$ which is different from the original item of data $1_o$. In the example shown, the numbers in broken lines illustrate the errors which can be made in the reproduced signals $I_r$ due to decoding of the signal $S_r$.

FIGS. 2A and 2B relate to a digital recording using the magnetic biasing according to prior art. In these FIGS., $S_{ic}$ designates a coded data signal produced from an original item of data (not shown) according to any code and alternating between two predetermined levels, referenced +1 and −1. $S_p$ designates a high frequency alternating, magnetic bias signal having constant amplitude +c. $S_e$ designates the recording signal resulting form the superimposition of the preceding signals $S_{ic}$ and $S_p$, and $S_r$ designates the signal reproduced after recording and reading of the signal $S_e$. From FIG. 2A, the moment $t_o$ of appearance of a positive transition of the data signal $S_{ic}$ corresponds to the most favorable recording situation, while in FIG. 2B, the moment $t_1$ corresponds to the least favorable situation.

In these FIGS., the recording signal S, which excites the winding of the write head, is an oscillating alternating current on both sides of a transition, between values +a to −b and −a to +b. Intensities of ±a relate to weak currents and intensitities of 35 b represent strong currents across the winding. The positive and negative transitions are respectively represented by jumps between the levels +a to +b and −a to −b. Detection of the peak of the first half-wave which marks such a jump is interpreted, after reading the recorded signal $S_e$, as the moment of transition, as illustrted by the signals $S_r$ reproduced in FIGS. 2A and 2B. Under these conditions, on the one hand the linearity of the alternating signal $S_e$ means little (contrary to the analogue recording) so that the ±b levels correspond in practice to the saturation levels of the magnetic material of the recording carrier and so that the relationship between the level referenced 1 of the data signal $S_{ic}$ and the level c of the biasing signal $S_p$ is relatively large (generally of the order of ¼ compared with that generally used 1/10 in analogue recording). On the other hand, it is desirable that the peak of the first positive or negative half-wave marking the transition in recording signal $S_e$ coincides respectively with the corresponding positive or negative transition of the data signal $S_{ic}$ so as thus to avoid any shifting of transitions in the signal $S_r$ reproduced. However, due to the fact that the transitions of the data signal $S_{ic}$ are distributed randomly in time, more or less favorable combinations with the alternating biasing signal $S_p$ will be produced. The most favorable situation is shown in FIG. 2A, from which it is seen that the positive transition at the moment $t_o$ of data signal $S_{ic}$ coincides with a positive peak of the biasing signal $S_p$ and that thus the superposition keeps this half-wave unchanged in time in order to designate the transition. The same applies for a negative transition of the data signal $S_{ic}$ and a negative peak of the biasing signal $S_p$. The least favorable situation is described in FIG. 2B, in which the positive transition at the moment $t_1$ of data signal $S_{ic}$ coincides with a negative peak of the biasing signal $S_p$ and the superposition introduces a delay d' in the appearance of the first half-wave transition in the recording signal. This delay is equivalent to a half-period of the biasing signal $S_p$. The same would go for a negative transition conjoint with a positive peak. The peak shift d' therefore relates the transition to a moment $t_2$ which, with high recording densities, could cause alternation of the contents of the original item of data.

By comparison with FIGS. 2A and 2B, FIG. 3 shows the advantages of a digital recording with phase modulated biasing signal according to the invention. In FIG. 3, $I_o$ designates an original binary item of data. $S_{ic}$ designates the corresponding data signal coded in NRZ1. $S_p$ designates an original biasing signal which is directly used in previous recording devices. $S_{pi}$ designates the corresponding phase modulated biasing signal, and $S_e$ designates the recording signal resulting from the combination of signals $S_{ic}$ and $S_{pi}$. It is apparent from the shape of the wave of the biasing signal $S_{pi}$ that the original biasing signal $S_p$ is phase-modulated on the transitions of the coded data signal $S_{ic}$ in the sense that, from each of these transitions the original biasing signal undergoes a successive phase-shift of 180°. In this way, the biasing signal $S_{pi}$ of the invention comprises extended levels h and low levels l which, combined with the respective transitions of the data signal $S_{ic}$, are able to reproduce the high and low levels in the recording signal $S_e$ in favorable conditions without any shifting.

Figure 4:
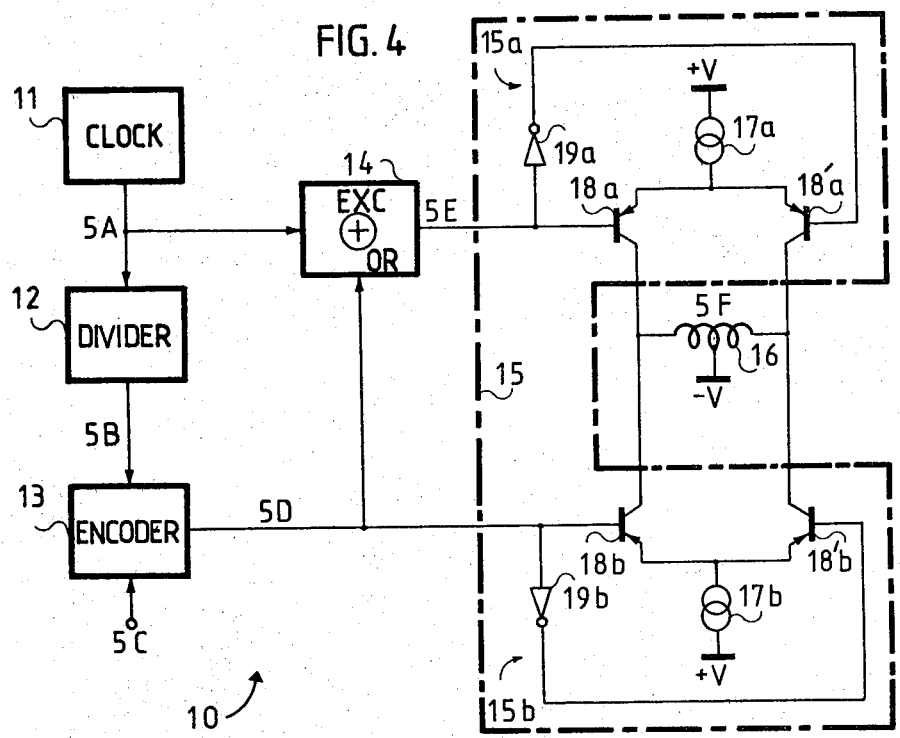
FIG. 4 shows an embodiment of a digital recording arrangement with phase modulated biasing signal.
Figure 5:
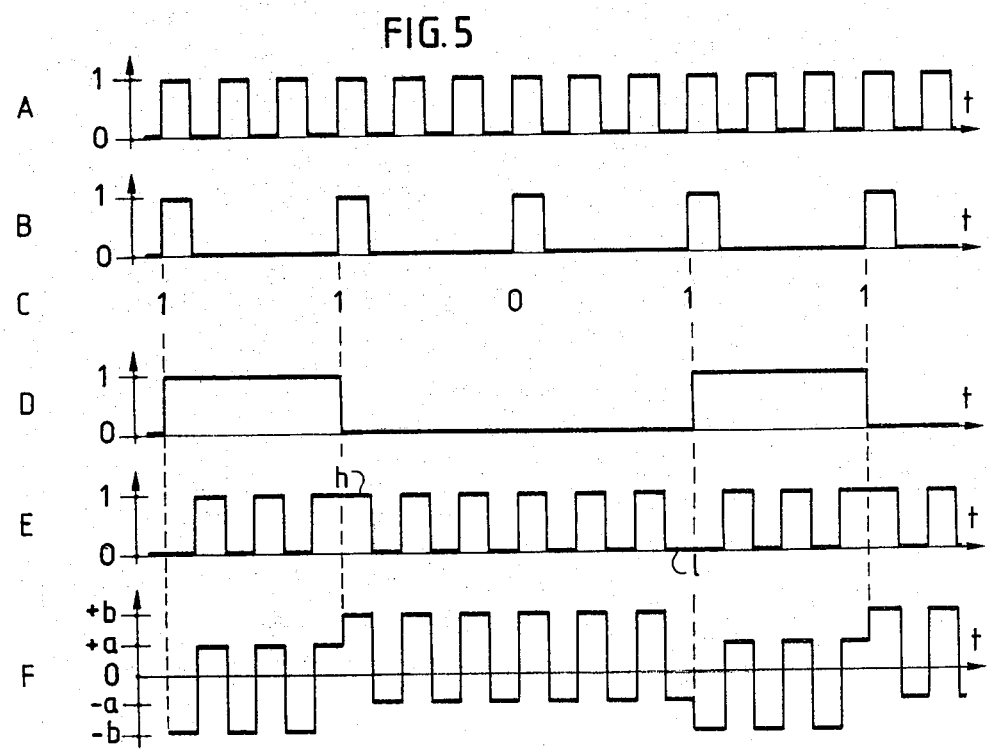
FIG. 5 comprising parts A to F illustrate examples of waveforms and data which can be obtained at various points of the recording arrangement shown in FIG. 4.

FIG. 4 shows an embodiment of a magnetic digital recording arrangement 10 with phase-modulated alternating biasing which will be described with reference to FIG. 5 illustrating, by way of example, waveforms 5A–5F which can be obtained at various points of the arrangement 10.

The digital recording device 10 incorporates a clock 11 which delivers a clock signal 5A composed of a series of pulses recurring at a given frequency $f_H$ and at 0.5 cycle ratio (square pulse signal). Signal 5A is applied to an input of a $-N$ frequency divider 12, which produces a signal 5B composed of a series of recurring pulses $f_h/N$ (N being a whole mumber whose value here is 3). An encoder 13 has a first input receiving the output signal 5B of the frequency divider 12 and a second input receiving an original item of data 5C to be recorded. The encoder 13 synchronizes the signal 5B with the frequency of recurrence of data bits 5C and effects a predetermined coding to deliver a coded data signal 5D equivalent to the above-mentioned signals $S_{ic}$. The code chosen by way of example in FIGS. 4 and 5, as in the other figures which follow, is such that the transitions are representative of the bits of value 1 of data 5C so as to obtain a recording signal of the type NRZ1. It will be noted that the signals 5A, 5B and 5D shown and the signal 5E, which will be considered further on, are direct current signals of logic values 0 and 1, although these signals could be alternating like those shown in the preceding figures. Actually, the components introduced into the circuit arrangement 10 for the formation of these signals operate on direct current, a conversion onto alternating current of the signals concerned for the formation of the recording signal being made later.

The clock signal 5A and the data signal 5D are applied respectively to two inputs of an exclusive OR gate 14 delivers a signal 5E at its output. The gate 14 plays the part of a phase modulator modulating, by a predetermined value (180°), the phase of the clock signal 5A (equivalent to the original biasing signal $S_p$ indicated in FIG. 3) on each appearance of the data signal transitions 5D to furnish as a result a modulated biasing signal 5E equivalent to the signal $S_{pi}$ of FIG. 3.

The biasing signal 5E coming from the gate 14 and the coded data signal 5D and fed respectively to two inputs of a combining circuit element 15 furnishes at its output a recording signal 5F intended for the recording winding 16 of of the recording head, which is not shown. The combination circuit 15 is formed basically by two current switches 15a, 15b which respectively receive the biasing signal 5E and the data signal 5D. The switches 15a and 15b respectively comprise two current sources 17a, 17b which are supplied by a voltage source $+V$ and two pairs of transistors 18a, 18a', 18b and 18b', of which the emitters are connected in common to the output of the respective current sources 17a and 17b and the collectors are connected to the end terminals of the recording winding 16. The center point of winding 16 is connected to a predetermined voltage $-V$.

The biasing signal 5E delivered by the gate 14 is applied directly to the base of the transistor 18a and, by means of an inverter 19a, to the base of the transistor 18'a. In the same way the data signal 5D is applied directly to the base of the transistor 18b and, by means of an inverter 19b, to the base of the transistor 18'b. The switches 15a and 15b thus switch the currents corresponding to signals 5D and 5E, which are thus made alternating. These currents are added together in the winding 16 in the form of signal 5F similar to the recording signal $S_e$ shown in FIG. 3. It will be noted that in FIG. 5, due to the phase displacement by 180° which occurs in the signal 5E on each transition of the data signal 5D, this phase modulation produces transitions from $+a$ to $+b$ and from $-a$ to $-b$ in the resulting signal 5F at instants which always correspond to the data signal transitions.

In the example shown in FIGS. 4 and 5, the clock signal 5A controls the formation of the data signal 5D by means of the frequency divider 12. The magnetic biasing signal 5E is synchronized with the clock signal 5A due to the phase modulator constituted by the gate 14.

Although the preceding examples are based on NRZ1 coding, the preceding description clearly brings out that the phase modulation can be applied independently of the shape of the two signals which comprise the recording signal. On the one hand it is sufficient for the coded data signal to be composed of a series of transitions, representative of any code whatsoever. On the other hand, given that only the intensitites of strong b and weak a currents are taken into account on reading and restitution of the data since they determine the work zone on the material magnetization curve indifferently to the switching times between strong and weak currents, and that thanks to the phase modulation, the combination of the biasing signal with the data signal is always produced favorably, this modulation is applicable to any shape of biasing signal whether it be a rectangular pulse, of any cyclic ration whatsoever, or an undulatory, sinusoidal signal.

Figure 6:
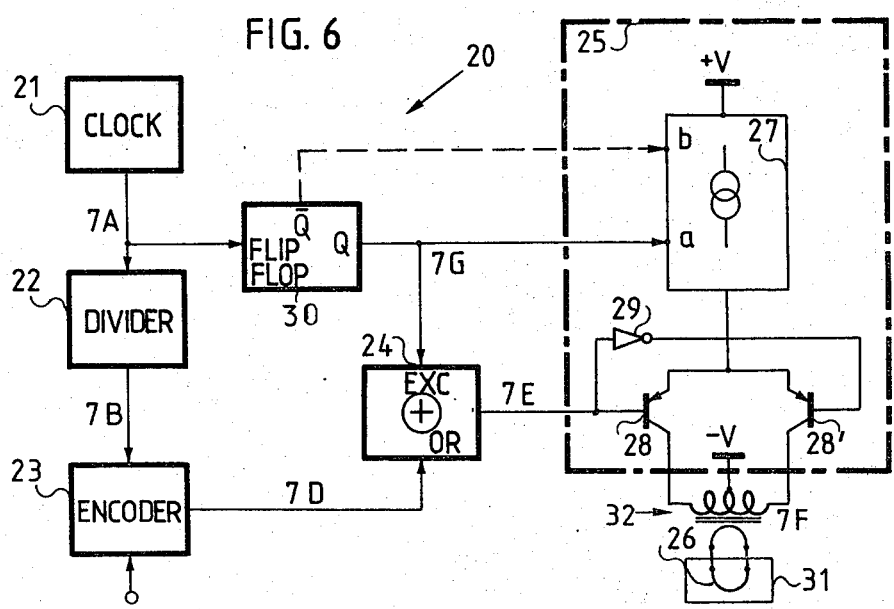
FIG. 6 shows an embodiment according to the invention of a digital recording arrangement with alternating biasing.
Figure 7:
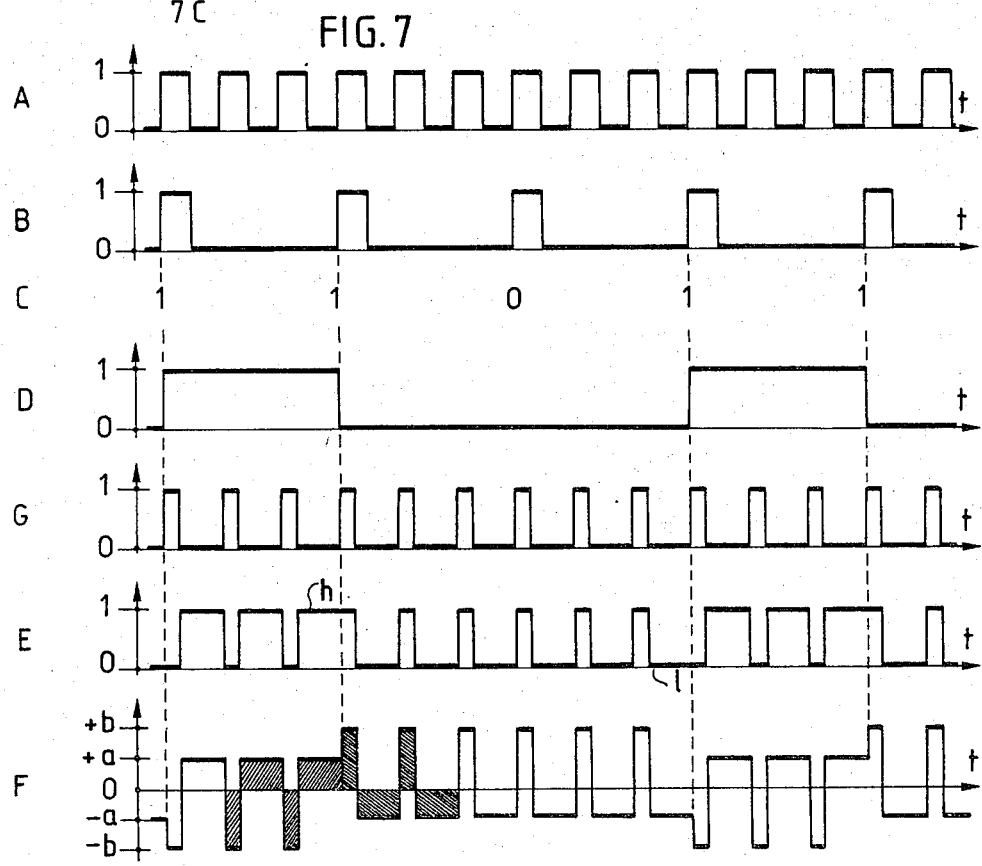
FIG. 7 comprising parts A-G illustrate respectively examples of waveforms and data which can be obtained at various points of the recording arrangement shown in FIG. 6.

FIGS. 6 and 7 show an example of a digital magnetic reading circuit arrangement 20 according to the present invention. The arrangement 20 is an advantageous modification of the embodiment of the arrangment 10 which has just been described. The similarity between the arrangements 10 and 20 is explained by the fact that the elements 21 to 29 of the arrangement 20 correspond respectively to elements 11 to 19 of the arrangement 10. Furthermore, signals 7A to 7F are similar respectively to signals 5A to 5F, while the signal 7G represents a signal involved in carrying out the present invention.

More precisely, in the same way as the recording arrangement 10, the arrangement 20 comprises a clock 21, a frequency divider 22, an encoder 23, an exclusive OR gate 24 and a combining circuit element 25 supplying a recording winding 26 and including a current source 27 which supplies a pair of transistors 28, 28' which are intended for excitation of the winding 26 and of which the bases are respectively connected to the output of the gate 24 directly and by means of an inverter 29. The clock 21 furnishes a clock signal 7A (square pulse signal). The divider 22 divides the frequency of the clock signal 7A by a predetermined whole number N (here N=3) to form a signal 7B acting as a clock for coding the original data signal 7C entering the encoder 23. This encoder effects the frequency synchronization of the signal 7C on the base of the signal 7B and thus furnishes the other input of the gate 24 with a continuous coded data signal 7D. Gate 24 constitutes a phase modulator to form a biasing signal 7E according to the invention, phase modulated as signals 5E and $S_{pi}$ (FIG. 3) but with an cyclic ratio adjusted in the manner described later on. The phase-modulated biasing signal 7E controls the combination element 25 illustrated as a variation of the normal embodiment of the combination element 15 shown in FIG. 4. According to this embodiment, the two transitors 28 and 28' are supplied by a current source 27, which has two inputs 27a and 27b for control of strong and weak currents respectively. The example shown relates to control by the input 27a, by which the weak current furnished during normal operation by the source 27 is switched to a strong current of predetermined intensity during a pulse of the signal supplied on the input 27a. The combination element 25, like the element in FIG. 4, combines the phase-modulated biasing signal 7E according to the invention with the coded data signal 7D to form a recording signal 7F similar to the signal 5F.

However, according to the invention, the recording signal 7F has a zero direct current component (called direct component). It has been shown previously that the phase modulation, as described with reference to FIGS. 3 to 5, is not affected by the shape of the two signals which comprise the recording signal. The shape of the phase-modulated biasing signal 7E is therefore selected, according to the invention, so that the recording signal 7F has a zero direct component. In the example shown, this shape is obtained by adjusting the cyclic ratio of an original biasing signal 7G by means of a monostable flip-flop 30 controlled by the square signal 7A issued from the clock 21. In that way, by simultaneously applying the original biasing signal 7G (similar to the signal $S_p$ of FIG. 3) on an input of the gate 24 on the input 27a for controlling the strong currents from the current source 27, the resulting recording signal 7F presents at each period—as shown by hatching—an equality between strong and weak current quantities. In particular, by an inversion of the direction of the hatching, the advantageous effect to the phase modulation is brought out, thanks to which it is possible to render null the direct component of the recording signal 7F.

Such a recording signal is thus able to excite the recording winding 26 of a recording head 31 by means of a transformer 32 (FIG. 6), of which the primary winding is supplied by the collectors of the transistors 28 and 28'. It follows that the recording can be effected to the limit with integrated heads 31 having a monoturn winding 26, of considerably more simple construction and reduced volume.

Figure 8:
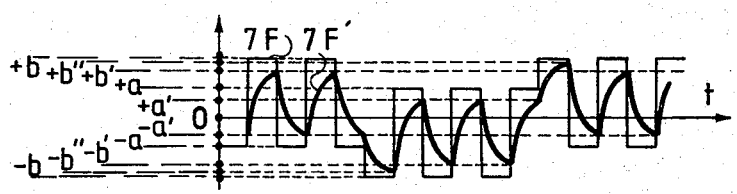
FIG. 8 shows, in broken lines, part of the theoretical signal shown in FIG. 7F and indicates, by a solid line, how this signal is made in practice.

Another advantage of the invention is shown in FIG. 8, which shows the theoretical signal 7F as a fine line and shown as a thick line the shape 7F' of the signal obtained in practice on the recording support. It will be noted, in effect, that the half-wave peak amplitude which marks each transition is greater than that of the other half-wave. Taking into account the resistive and capacitive parasitic components of the recording winding, the latter introduces a time constant for establishment of the recording signal about the peak values ±a and ±b. The result is that the actual signal 7F' cannot normally reach these values in the space of a half period and breaks at peak values /a'/</a/ and /b'/</b/. Because of the levels h and l introduced into the modulated biasing signal, the actual signal 7F' has a whole period available so that the peak amplitudes /b"/ of the half-waves marking the transitions are practically equal to /b/. This increases the reliability of reproduction of the recorded message.

Figure 9:
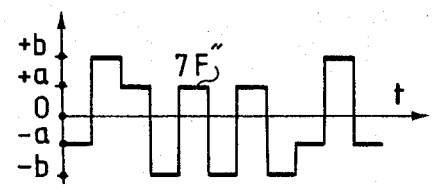
FIG. 9 illustrates a variation according to the invention of the signal shown in FIG. 7F.

It will also be noted that the positive and negative transitions of the data signals 5D and 7D correspond respectively to the low levels l and high levels h in the recorded signal 7F. FIG. 9 shows a recording signal 7F" which would be obtained if the source 27a was fed at its low current control input 27b by the signal complementary to the signal 7G issued from the complementary output $\overline{Q}$ of the flip-flop 30, as shown by the broken line connection in FIG. 6, the input 27a being of course no longer excited. In this case it is seen that the positive and negative transitions of the data signal 5D correspond respectively to the high and low levels of the recording signal 7F".

In the preceding description, the shaping of the phase modulated biasing signal so as to suppress the D.C. component of the recording signal is made previous to the phase modulation, by means of the flip-flop 30. This embodiment has, in effect, the advantage of making the invention easily understood by means of the example chosen, illustrated in FIGS. 4 and 5, for the phase modulation. However, it results clearly from the presentation of this embodiment that it is due to the phase modulation of the biasing signal, therefore of the recording signal in corespondence with the data signal transitions, that suppression of the D.C. component is possible, this suppression being reputed to be impossible with prior recording methods and devices. It is, therefore, permitted to suppress the D.C. component of the recording signal by acting at any stage whatsoever of its elaboration, i.e. before modulation as shown, during and after modulation and, at the limit, during and after combination of the phase modulated biasing signal with the data signal. This fact justifies the general formulation of the basic characteristic of the invention consisting in giving the recording signal a substantially zero D.C. component, it being of course understood that it is permitted for this purpose to act before, during and after formation of the signal, the phase modulated recording ratio, by modifying for example the cyclic ratio when circumstances analogous to those shown in FIGS. 6 and 7 are encountered.

Furthermore, since the present invention is based on the properties of phase modulation of the data signal relative to the data signal transitions, it is clear that it can equally well be applied to a pulse biasing signal such as is shown, as to an undulatory signal, the required condition being that the form of the signal used implies the generation of a recording signal with a substantially zero D.C. component. On the other hand, any coded data signal can be suitable if it is composed of a set of transitions in correspondence with any code whatsoever.

Furthermore, as indicated in my above-mentioned co-pending application Ser. No. 156,368 to which the present invention is related, other embodiments are possible such as, for example, the generation of the signal 7A from a clock signal for controlling coding of the data signal and by means of a phase-locking loop, as shown with reference to FIGS. 10 and 11 of the said application.

The invention is in no way limited to the embodiments described and illustrated but, on the contrary, comprises all embodiments coming within the scope of the claims which follow.

I claim:

1. A circuit arrangement for magnetic recording of a digital data signal composed of a set of transitions comprising magnetic biasing means for delivering a high frequency, constant amplitude, original biasing signal and means for combining the said digital data signal with the said magnetic biasing signal so as to provide a recording signal, said combining means comprising a current switch device connected to receive complementary formats of the data signal, a recording winding connected to said switch device to produce the recording signal, and a current source supplying the said current switch and controlled by strong or weak currents, means for phase modulating the original biasing signal relative to the data signal transitions and means connected to said phase modulating means for shaping the modulated biasing signal so as to suppress the D.C. components in the recording signal.

2. A circuit arrangement for magnetic recording of a digital data signal composed of a set of transitions comprising magnetic biasing means for delivering a high frequency, constant amplitude, original biasing signal, said biasing means comprising a source of clock signals having a first version used for the formation of the said original biasing signal and a second version used for the formation of the said data signal, and means for combining the said digital data signal with the said magnetic biasing signal so as to provide a recording signal, said combining means comprising a current switch device connected to receive complementary formats of the data signal, a recording winding connected to said switch device to produce the recording signal, and a current source supplying the said current switch and controlled by strong or weak currents, means for phase modulating the original biasing signal relative to the data signal transitions and means connected to said phase modulating means and responsive to said clock signals for shaping the phase modulated signal to suppress D.C. components of the recording switch.

3. A circuit arrangement for magnetic recording of a digital data signal composed of a set of transitions comprising magnetic biasing means for delivering a high frequency, constant amplitude, original biasing signal, said biasing means comprising a source of clock signals having a first version used for the formation of the said original biasing signal so as to provide a recording signal, said combining means comprising a current switch device connected to receive complementary formats of the data signal, a recording winding connected to said switch device to produce the recording signal, and a current source supplying the said current switch and controlled by strong or weak currents, means for phase modulating the original biasing signal relative to the data signal transitions, said phase modulation means comprising an exclusive OR gate receiving the said original biasing signal and the said data signal and flip flop means controlled by said clock signals and having an output connected to said OR gate for shaping the phase modulated signal to thereby suppress DC components in the recording signal.

4. A circuit arrangement for magnetic recording of a digital data signal composed of a set of transitions comprising magnetic biasing means for delivering a high frequency, constant amplitude, original biasing signal, said biasing means comprising a source of clock signals having a first version used for the formation of the said original biasing signal and a second version used for the formation of the said data signal, and means for combining the said digital data signal with the said magnetic biasing signal so as to provide a recording signal, said combining means comprising first and second D flip-flops, the first flip-flop receiving the said first version of the clock signal on its D input and a second clock signal whose frequency corresponds to a whole multiple of the frequency of the said first version of the first clock signal on its G input, and the second D flip-flop receiving the said original biasing signal on its D input and the said clock signal on its G input, the Q and $\overline{Q}$ outputs of the second D flip-flop producing complementary formats of the data signal, means for phase modulating the original biasing signal relative to the data signal transitions and means for shaping the phase modulated signal to suppress D.C. components in the recording signal, said means for shaping comprising a flip-flop having a control input connected to receive said clock signals, and an output connected to said phase modulating means.

5. A circuit arrangement for magnetic recording of a digital data signal composed of a set of transitions comprising magnetic biasing means for delivering a high frequency, constant amplitude, original biasing signal, means for combining the said digital data signal with the said magnetic biasing signal so as to provide a recording signal, said combining means comprising two current switch devices respectively furnishing signals which are representative of the phase modulated biasing signal and the said data signal and a recording winding connected to said switch devices to produce the recording signal, means for phase modulating the original biasing signal relative to the data signal transitions, said phase modulation means comprising an exclusive OR gate receiving the said original biasing signal and the said data signal and means for shaping the phase modulated signal to suppress D.C. components in the recording signal.

6. A circuit arrangement for magnetic recording of a digital data signal composed of a set of transitions comprising magnetic biasing means for delivering a high frequency, constant amplitude, original biasing signal, said biasing means comprising a source of clock signals having a first version used for the formation of the said original biasing signal and a second version used for the formation of the said data signal, and means for combining the said digital data signal with the said magnetic biasing signal so as to provide a recording signal, and means for phase modulating the original biasing signal relative to the data signal transitions, said phase modulation means comprising an exclusive OR gate having a first input connected to receive the said original biasing signal and the said data signal, the combining means comprising two current switch devices respectively furnishing signals which are representative of the phase modulated biasing signal and the said data signal, a recording winding connected to said switch devices to produce the recording signal and a flip-flop connected to receive said clock signals and output to said phase modulating means for suppressing D.C. components in the recording signal.

7. A circuit arrangement as set forth in claims 1 or 2, wherein the means connected to said phase modulating means comprises a flip-flop operatively connected for adjusting the cyclic ratio of the biasing signal.

8. A circuit arrangement as set forth in claim 1,2,4,5,6 wherein the output of the means connected to the phase modulating means for suppression of D.C. components in the recording signal is also connected to a control input of the current source.

* * * * *